United States Patent
Song et al.

(10) Patent No.: US 6,597,143 B2
(45) Date of Patent: Jul. 22, 2003

(54) MOBILE ROBOT SYSTEM USING RF MODULE

(75) Inventors: Jeong-gon Song, Kwangju (KR); Sang-yong Lee, Kwangju (KR)

(73) Assignee: Samsung Kwangju Electronics Co., Ltd., Kwangju (KR)

( * ) Notice: Subject to any disclaimer, the term of this patent is extended or adjusted under 35 U.S.C. 154(b) by 0 days.

(21) Appl. No.: 09/880,405

(22) Filed: Jun. 12, 2001

(65) Prior Publication Data

US 2002/0060542 A1 May 23, 2002

(30) Foreign Application Priority Data

Nov. 22, 2000 (KR) ........................................ 2000-69620

(51) Int. Cl.$^7$ ................................................ G05D 1/00
(52) U.S. Cl. ........................ 318/581; 701/23; 15/323; 15/340.1; 318/587; 318/283; 318/286
(58) Field of Search ................................ 318/581, 587, 318/283, 286; 701/23; 340/988; 15/323, 340.1

(56) References Cited

U.S. PATENT DOCUMENTS

| | | | |
|---|---|---|---|
| 5,465,525 A | 11/1995 | Mifune et al. | |
| 5,621,291 A | 4/1997 | Lee | |
| 5,841,259 A | * 11/1998 | Kim et al. | 318/587 |
| 6,338,013 B1 | * 1/2002 | Ruffner | 701/23 |

FOREIGN PATENT DOCUMENTS

| | | |
|---|---|---|
| GB | 2 344 747 A | 6/2000 |
| JP | 05091556 | 4/1993 |

* cited by examiner

*Primary Examiner*—Khanh Dang
(74) *Attorney, Agent, or Firm*—Westman, Champlin & Kelly, P.A.

(57) ABSTRACT

A mobile robot system includes a RF module that is under the control of a controlling computer. The mobile robot system includes a running device for moving the mobile robot about a room, an obstacle detecting device for detecting the presence of an obstacle in the mobile robot's path, a location recognizing device, a first transceiver for transmitting and receiving a signal to control the various devices, and a controlling computer for data processing the signal from the first transceiver and transmitting a control command to the mobile robot. The controlling computer includes a second transceiver for transmitting and receiving a signal to and from the first transceiver, an image board for processing image data from the obstacle detecting device and the location recognizing device, and connecting means for connecting to the Internet. The mobile robot is compact and sized and can be remotely controlled via the Internet.

8 Claims, 4 Drawing Sheets

MOBILE ROBOT SYSTEM USING RF MODULE

BACKGROUND OF THE INVENTION

1. Field of the Invention

The present invention relates to a mobile robot system, and more particularly, to a mobile robot system having a mobile robot for performing a running operation and a data collecting operation, and a separate controlling computer for performing data processing. The mobile robot and controlling computer are connected to each other via an RF module for data transmission and receipt.

2. Description of the Related Art

Generally, a mobile robot is provided with functions that enable the mobile robot to run independently and avoid obstacles without external help. FIG. 1 is a block diagram illustrating the various features of the mobile robot.

As shown in FIG. 1, the mobile robot includes a running device 30 for moving the mobile robot, an obstacle detecting device 40 for detecting a presence of an obstacle in the mobile robot's path, a location recognizing device 20 for recognizing a current location of the mobile robot, a controller 10 for controlling general operations of the mobile robot, and a power supply 60 for storing and supplying necessary electricity to the respective components of the mobile robot. In addition, a remote-controllable transceiver 50 is provided to remotely control the start/stop of the mobile robot.

The operation of the mobile robot constructed as above will be described in detail below.

Upon receipt of a start command, the controller 10 of the mobile robot 1 initializes and transmits a run-command to the location recognizing device 20 and the obstacle detecting device 40. Upon receipt of the run-command from the controller 10, the location recognizing device 20 and the obstacle detecting device 40 respectively operate vision cameras 21 and 43 thereof to capture an image. After the image is captured, vision boards 23 and 46 of the location recognizing device 20 and the obstacle detecting device 40 use threshold setting or thinning processes to reduce the data size as small as possible. The data is then transmitted to the controller 10. Upon receipt of the image data from the location recognizing device 20 and the obstacle detecting device 40, the controller 10 processes the image data in an image processor 11, recognizes a current location of the mobile robot 1, determines the presence of the obstacle in the path of the mobile robot 1, and starts the running device 30. Since the above-described processes are continuously performed during operation of the mobile robot 1, the mobile robot 1 can perform a predetermined job without colliding into any obstacles.

The mobile robot uses vision cameras (CCD cameras 21 and 43) to capture images of objects to help the mobile robot 1 recognize its current location and detect the presence of any obstacles. Data obtained from the images captured by the vision cameras 21 and 43 is usually so massive that the data cannot be used in its present form. Accordingly, the size of the data must be reduced by proper processes, such as thresholding or thinning. These steps are usually performed by vision boards 23 and 45, each of which has an image data processor. The data is processed in the vision boards 23 and 45 into image data, and the image processor 11 of the controller 10 determines the current location of the mobile robot 1 and the distance and shape of the obstacle based on such image data.

Since mechanisms for processing the images captured by the vision cameras 21 and 43 have to be mounted in the body of the run mobile robot 1, such mobile robot 1 has a disadvantage of a bulky size.

Further, the remote control for the conventional mobile robot 1 only controls a start or stop signal sent to the mobile robot. Considering the widespread preference toward home appliances that can be controlled via the Internet, the conventional mobile robot 1, which is not controllable via the Internet, is less attractive to potential customers.

SUMMARY OF THE INVENTION

The present invention has been made to overcome the above-mentioned problems of the prior art. Accordingly, it is an object of the present invention to provide a compact-sized mobile robot system, which is controllable via the Internet. This is accomplished by connecting an automatically running mobile robot to a computer that is connected to the Internet. The computer is capable of processing the image data from the mobile robot through a wireless communication using an RF module.

The above object is accomplished by a mobile robot system according to the present invention including a running device for moving the mobile robot about a room an obstacle detecting device for detecting a presence of an obstacle in the path of the mobile robot, a location recognizing device for recognizing a location of the mobile robot, a first transceiver for transmitting and receiving a signal to control the running device, the obstacle detecting device and the location recognizing device, and a controlling computer for data processing the signal from the first transceiver and transmitting a control command for the mobile robot.

The controlling computer includes a second transceiver for transmitting and receiving signals to and from the first transceiver of the mobile robot, an image board for processing image data of the obstacle detecting device and the location recognizing device received through the first transceiver, and connecting means for connecting the controlling computer to the Internet.

Accordingly, the mobile robot system is compact in size and controllable via the Internet.

Further, the mobile robot can be provided with a vacuum cleaner having a suction port for drawing in contaminants, a dust collecting portion for collecting the contaminants therein, and a motor driving portion for generating a suction force. The mobile robot also can be provided with a vision camera to monitor an area. Accordingly, the mobile robot system using the RF module can serve as either a cleaning robot or a guard robot.

BRIEF DESCRIPTION OF THE DRAWINGS

The above and other objects and advantages of the present invention will become readily apparent by reference to the following detailed description when considered in conjunction with the accompanying drawings, in which.

DETAILED DESCRIPTION OF THE PREFERRED EMBODIMENT

Figure 1:
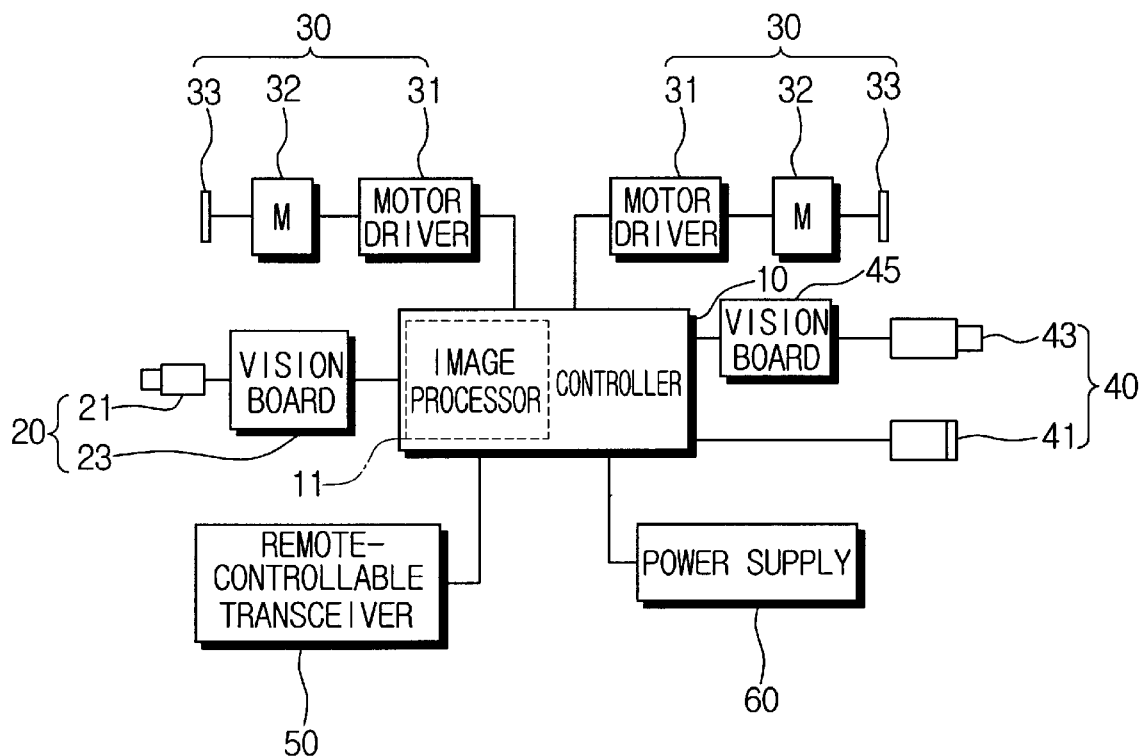
FIG. 1 is a block diagram illustrating the functions of a conventional mobile robot.

The preferred embodiment of the present invention will be described below with reference to the accompanying drawings, wherein like elements are given the same reference numerals throughout.

Figure 2:
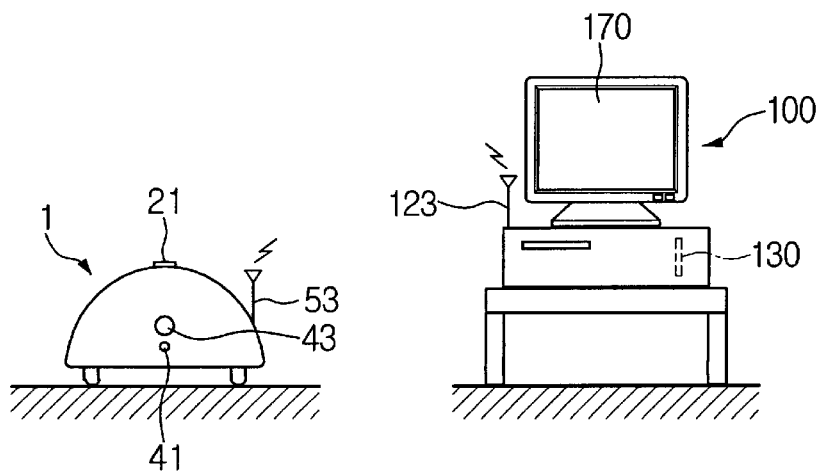
FIG. 2 is a schematic view showing a mobile robot system using a RF module, in accordance with the present invention.
Figure 3:
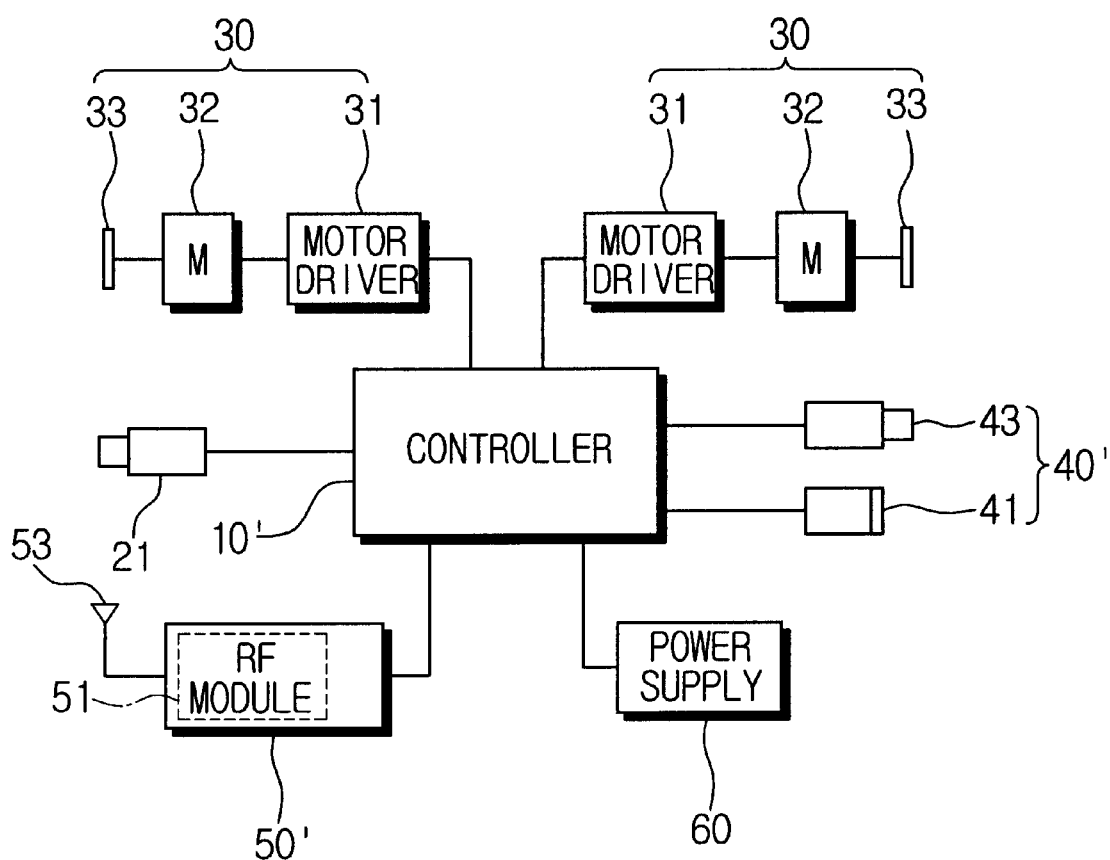
FIG. 3 is a block diagram illustrating the functions of the mobile robot of FIG. 2.
Figure 4:
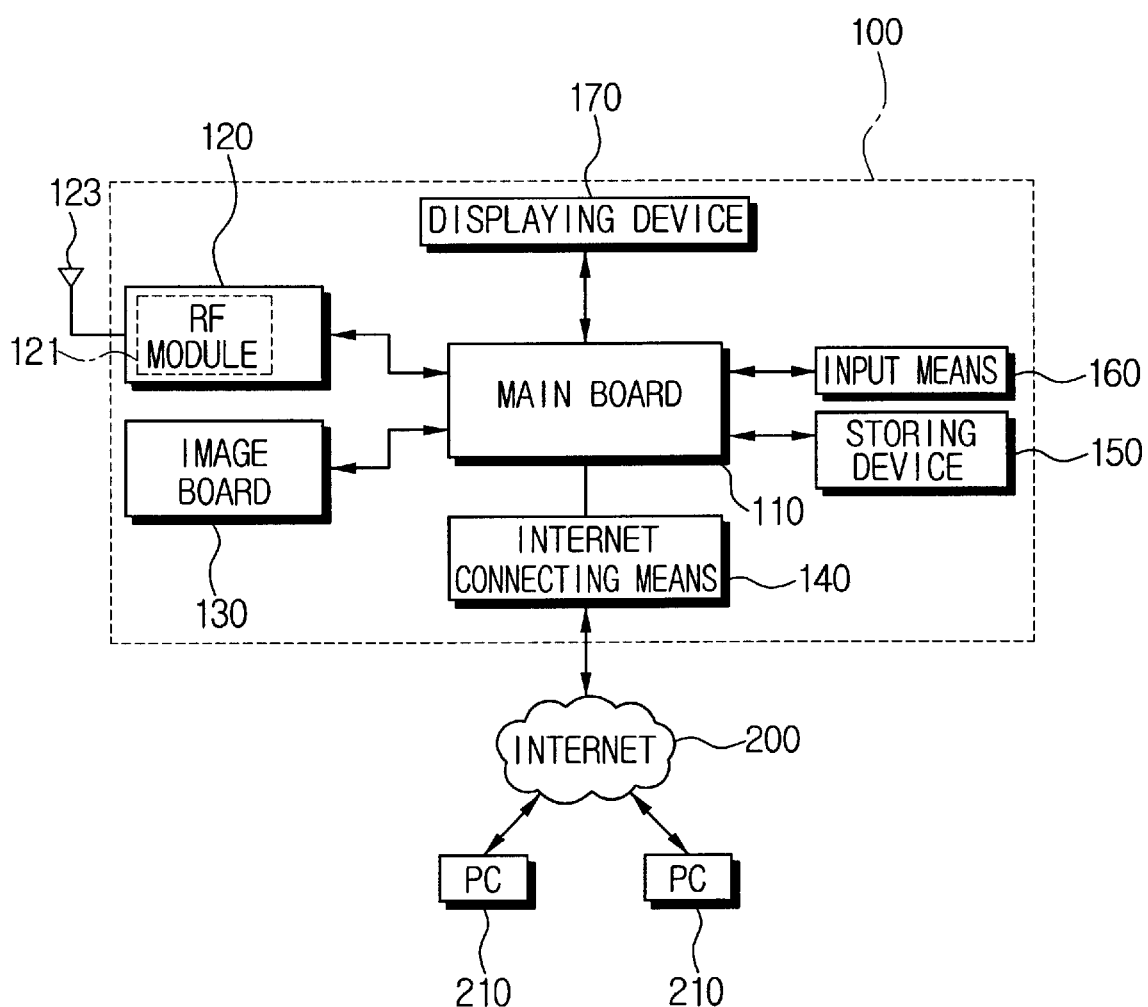
FIG. 4 is a block diagram illustrating the functions of a controlling computer for the mobile robot of FIG. 2.

Referring first to FIGS. 2 and 3, the mobile robot system having the RF module in accordance with the present invention includes a mobile robot 1 and a controlling computer 100.

The mobile robot 1 includes a running device 30 for moving the mobile robot 1 about a room, a location recognizing device having a vision camera 21 for recognizing a current location of the mobile robot 1, an obstacle detecting device 40' for detecting the presence of an obstacle in the path of the mobile robot 1, a first transceiver 50' for transmitting and receiving image data to and from the controlling computer 100, a controller 10' for controlling respective components of the mobile robot 1 in accordance with instructions from the controlling computer 100, and a power supply 60 for storing and supplying necessary electricity to the respective components of the mobile robot 1.

The running device 30 includes a pair of wheels 33, which can move forward and backward and left and right, a motor 32 for driving each of the wheels 33, and a motor driver 31 for controlling the respective motor 32 according to signals from the controller 10'.

The obstacle detecting device 40' includes a line laser 41 for emitting linear light beams in the path or running direction of the mobile robot 1, and a vision camera 43 for recognizing linear light beams reflected from the obstacle that is located in the path of the mobile robot 1. Both the line laser 41 and the vision camera 43 are controlled by the controller 10'.

The first transceiver 50' includes an RF module 51 and an antenna 53, and is connected to the controller 10' to transmit images photographed by the vision cameras 21 and 43 of the respective location recognizing device and obstacle detecting device 40'. The first transceiver 50' further receives a run-command from the controlling computer 100.

The power supply 60 is a storage battery, which stores a predetermined level of electricity, and supplies the electricity to the respective components of the mobile robot 1 when necessary.

The controlling computer 100 includes a second transceiver 120 for transmitting and receiving data to and from the mobile robot 1, an image board 130 for processing image data from the mobile robot 1, an Internet connecting means 140 for connecting the controlling computer 100 to the Internet 200, a storing device 150 for storing data necessary for operation of the software installed in the controlling computer 100, an input means 160 for inputting necessary data in the controlling computer 100, a main board 110 for generally controlling the respective components of the controlling computer 100, and a displaying device 170 for displaying results processed by the main board 110.

The second transceiver 120 includes a RF module 121 and an antenna 123. The second transceiver 120 transmits the data from the first transceiver 50' of the mobile robot 1 to the main board 110 as well as instructions from the main board 110 of the controlling computer 100 to the mobile robot 1.

The image board 130 is a card-type board, which can be inserted into a slot in the controlling computer 100. The image board 130 processes the image data from the mobile robot 1, enabling the main board 110 to do calculate the current location of the mobile robot 1 and determine the shape of any obstacle by calculating the distance to the obstacle, etc. More specifically, the image board 130 processes the image data from the vision camera 21 of the location recognizing device through a thresholding process, and transmits the same to the main board 110. Further, the image data of the linear light beam from the line laser 41, which is captured by the vision camera 43 of the obstacle detecting device 40', is transmitted to the main board after undergoing the processes of threshold and thinning.

The displaying device 170, input means 160, storing device 150, and main board 110 of the controlling computer 100 are identical to those used in a general personal computer. Further, the Internet connecting means 140 connects the controlling computer 100 to the Internet through an Internal cable or modem, similar to the connection between the general personal computer and the Internet. Accordingly, a detailed description of the Internet connection will be omitted.

Figure 5:
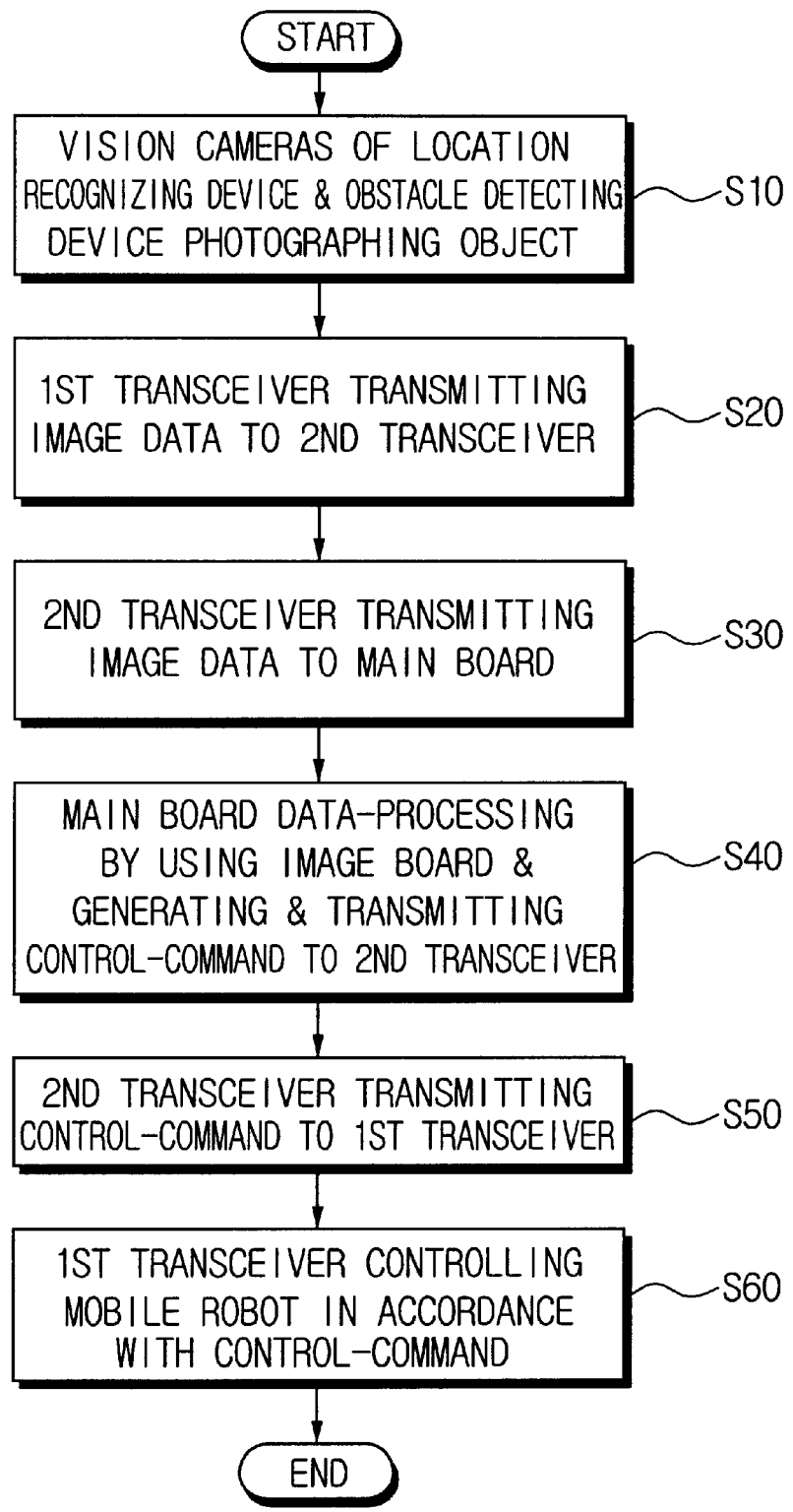
FIG. 5 is a flow chart illustrating an operation of the mobile robot system of the present invention using the RF module.

The operation of the mobile robot system with the RF module will be described below with reference to FIG. 5.

The mobile robot 1 first receives a start-command from the controlling computer 100. The start-command is transmitted to the mobile robot 1 through the first transceiver 50'. In response to the start-command, the controller 10' initializes and transmits a command to the location recognizing device and the obstacle detecting device 40' to capture an image. Upon receipt of the command from the controller 10', the vision camera 21 of the location recognizing device photographs a ceiling, to which a base mark is attached. The line laser 41 of the obstacle detecting device 40' emits a linear light beam in forward direction, and the vision camera 43 recognizes a reflected linear light beam and generates an image of the object in the path of the linear light beam (step S10).

The controller 10' transmits the images generated by the obstacle detecting device 40' and the vision camera 21 of the location recognizing device to the second transceiver 120 of the controlling computer 100 through the RF module 51 and the antenna 53 of the first transceiver 50' (step S20).

The second transceiver 120 of the controlling computer 100 receives the images from the first transceiver 50' of the mobile robot 1 and transmits the images to the main board 110. Then, the main board 110 sends out the images to the image board 130 where the images are processed. The image board 130 processes the images captured by the vision cameras 21 and 43 of the respective location recognizing device and obstacle detecting device 40' into image data through thresholding and thinning processes, and sends the image data back to the main board 110 (step S30).

Upon receipt of the image data of the location recognizing device that has been processed by the image board 130, the main board 110 obtains coordinates of the base mark through the processes such as a region correlation, and determines the current location of the mobile robot 1. Further, by using the image data of the obstacle detecting device 40', the main board 110 calculates the distance between the mobile robot 1 and any obstacle and determines the shape of the obstacle based. After determining a targeting location and the status of the obstacle before of the mobile robot 1, the main board 110 combines the information and generates a control command for operation of the mobile robot 1, such as stop or go, and sends the control command to the second transceiver 120 (step S40).

The second transceiver 120 transmits the control command from the main board 110 to the first transceiver 50' of the mobile robot 1 through the RF module 121 and the antenna 123 (step S50).

The first transceiver 50' of the mobile robot 1 receives the control command from the controlling computer 100, and transmits the control command to the controller 10' of the mobile robot 1. The controller 10' then operates the mobile robot 1, while controlling the location recognizing device and the obstacle detecting device 40' in accordance with the control command it received (step S60).

Since the above-mentioned processes are periodically repeated at predetermined time intervals, the mobile robot 1 can perform given operation under the control of the controlling computer 100.

Further, since the controlling computer 100 is connected to the Internet 200 via the Internet connecting means 140, a user can control the mobile robot 1 not only while present in the area where the mobile robot 1 is designated, but also while the user is at a remote location using another computer 210. That is, after connecting another computer 210 to the Internet 200 and to the controlling computer 100, the user can operate the mobile robot operating program that furnished in the controlling computer 100, and thereby operate the mobile robot 1 from the remote location.

Such a mobile robot 1 operating as described above can be provided with other devices for performing an operation user wishes.

For example, for a cleaning operation, the mobile robot 1 may be provided with a vacuum cleaner which includes a suction port for sucking in contaminants, a dust collecting portion for collecting contaminants therein, and a motor driving portion for generating a suction force. Then the mobile robot 1 can clean a given area while automatically running.

For guarding a house from a possible intruder, or protecting children, the mobile robot 1 can be provided with a monitoring vision camera, by which a user can monitor what is happening in and around the house in a real-time. While the currently available monitoring cameras are fixed and only monitor a given area, the mobile robot 1 has an advantage of being able to monitor every corner of the house.

As described above, in the mobile robot system having the RF module according to the present invention, is compact in size, since bulky components, such as a vision board for processing image data in the mobile robot 1 is omitted. Further, the mobile robot system of the present invention allows a user greater freedom to access the mobile robot from a remote location, since the user can control the mobile robot 1 via the Internet.

As stated above, a preferred embodiment of the present invention is shown and described. Although the preferred embodiment of the present invention has been described, it is understood that the present invention should not be limited to this preferred embodiment. Various changes and modifications can be made by one skilled in the art within the spirit and scope of the present invention as hereinafter claimed.

What is claimed is:

1. A mobile robot system comprising:
    a mobile robot comprising:
        a running device for moving the mobile robot about a room;
    an obstacle detecting device for detecting a presence of an obstacle in a path of the mobile robot, the obstacle detecting device including a camera;
    a location recognizing device for recognizing a location of the mobile robot;
    a first transceiver for transmitting image data from the camera and receiving a signal to control the running device, the obstacle detecting device and the location recognizing device;
    a controlling computer separated from the mobile robot for data processing the signal received from the first transceiver, and transmitting a control command to the mobile robot:
    a second transceiver for transmitting and receiving a signal to and from the first transceiver of the mobile robot;
    an image board for processing image data from the camera device, the image data being received from the first transceiver by the second transceiver; and
    the controlling computer configured to calculate a current location of the mobile robot, determine a shape of an obstacle based upon received image data and responsively send the control command to the mobile robot through the first and second transceiver based upon the location; and
    wherein the obstacle avoidance function is off-loaded from the mobile robot to the controlling computer.

2. The mobile robot system as claimed in claim 1, wherein the controlling computer comprises:
    connecting means for connecting the controlling computer to the Internet.

3. The mobile robot system as claimed in claim 1, wherein the mobile robot comprises a vacuum cleaner including:
    a suction port for sucking in contaminants;
    a dust collecting portion for collecting the contaminants therein; and
    a motor driving portion for generating a suction force.

4. The mobile robot system as claimed in claim 1, wherein the mobile robot further comprises a monitoring vision camera.

5. The mobile robot system as claimed in claim 1 wherein the image board processes image data through a thresholding process.

6. The mobile robot system as claimed in claim 1 wherein the controlling computer includes a mainboard coupled to the image board.

7. The mobile robot system as claimed in claim 1 wherein the obstacle detecting device includes a line laser, the image data is from a linear light beam from the line laser and the image board processes the image data through a thresholding and thinning process.

8. The mobile robot system as claimed in claim 1 wherein the camera photographs a ceiling and a base mark is attach thereto.

* * * * *